US006852768B2

(12) United States Patent
Jin et al.

(10) Patent No.: US 6,852,768 B2
(45) Date of Patent: Feb. 8, 2005

(54) LOW VISCOSITY SCRATCH RESISTANT COATINGS USING TEXTURIZING AND INORGANIC FILLERS

(75) Inventors: Pei Wen Jin, Cary, NC (US); Kimberly R. Benca, Clayton, NC (US); Ian C. Quarmby, Apex, NC (US); Thomas Kurpiewski, Erie, NC (US); Victor E. Ferrell, Fuquay-Varina, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/264,040

(22) Filed: Oct. 3, 2002

(65) Prior Publication Data

US 2003/0153643 A1 Aug. 14, 2003

Related U.S. Application Data

(63) Continuation-in-part of application No. 09/971,306, filed on Oct. 3, 2001.

(51) Int. Cl.$^7$ .................................................. C08F 2/46
(52) U.S. Cl. ................. 522/79; 522/81; 522/77; 522/71; 522/96; 522/90; 522/83; 522/104; 522/107; 522/100; 522/168; 522/170; 522/113; 522/120; 522/114; 522/121; 427/508; 427/487; 428/323; 428/325; 428/331; 428/409; 524/430; 524/437; 524/438; 524/492; 524/493; 524/914
(58) Field of Search ................. 427/487, 496, 427/508, 518; 524/430, 437, 438, 492, 493, 914; 522/90, 96, 100, 104, 107, 71, 77, 79, 81, 83, 168, 170, 120, 121; 428/331, 332, 328, 329

(56) References Cited

U.S. PATENT DOCUMENTS

| 4,652,470 A | 3/1987 | Schappert et al. |
| 4,719,146 A | 1/1988 | Hohage et al. |
| 5,763,048 A | 6/1998 | Takahashi |
| 5,853,809 A | 12/1998 | Campbell et al. |
| 5,997,894 A | 12/1999 | Blum et al. |
| 6,228,433 B1 * | 5/2001 | Witt ........................... 427/487 |
| 6,332,291 B1 | 12/2001 | Flosbach et al. |
| 6,399,670 B1 | 6/2002 | MacQueen et al. |
| 6,399,689 B1 | 6/2002 | Scarlette |

FOREIGN PATENT DOCUMENTS

| EP | 235914 | 1/1981 |
| GB | 2 232 672 | 12/1990 |
| WO | WO 00/39042 | 7/2000 |

* cited by examiner

Primary Examiner—James J. Seidleck
Assistant Examiner—Sanza L. McClendon
(74) Attorney, Agent, or Firm—Miles B. Dearth

(57) ABSTRACT

The invention provides curable organic coatings with improved scratch resistance. More particularly, the present invention relates to a combination of inorganic filler having a $50^{th}$ percentile particle diameter of from about 3 to about 9 micrometers comprised of aluminum oxide, silicon dioxide, ceramic spheres or mixtures thereof, and particles having a $50^{th}$ percentile particle diameter of from about 10 to about 150 micrometers. The liquid coatings have a viscosity before curing of from about 100 cps (mPa-s) to about 70,000 cps (mPa-s) at a shear rate of 0.15 s$^{-1}$. The use of inorganic filler materials of the defined type and particle size are combined with the curable organic coating to improve the scratch resistance of the coating without a negative impact on the physical and performance properties or application parameters of the original coating material. The present invention also provides organic coatings comprising texture-producing particles which provide the coating with texture after the coating has been cured.

36 Claims, 1 Drawing Sheet

LOW VISCOSITY SCRATCH RESISTANT COATINGS USING TEXTURIZING AND INORGANIC FILLERS

CROSS-REFERENCE

This Application is a Continuation-In-Part of co-pending application Ser. No. 09/971,306 filed Oct. 3, 2001.

FIELD OF THE INVENTION

The present invention relates to organic coatings with improved scratch resistance. More particularly, the present invention relates to the use of inorganic filler materials of a defined type and particle size which can be added to organic coatings to improve the scratch resistance of the coating without a negative impact on the physical and performance properties or application parameters of the original coating material.

The coatings have utility on materials such as wood, MDF, rigid plastics such as PVC, for flooring, decorative tiles, home furnishings such as cabinets, furniture, and paneling, and machinery, appliance, and equipment housings, to name a few advantageous uses.

BACKGROUND OF THE INVENTION

Organic coatings such as those made from radiation curable and thermoset polymers are known for use in applications where the appearance of the coating is fundamental to its overall function, such that scratches on or through the surface would render the coating unsuitable or undesirable for continued use. Scratches not only detract from the overall appearance, but also compromise the integrity of the substrate. Past approaches to scratch resistant coatings focused on the use of harder polymers. However, these harder polymers were a result of increased crosslink density and showed inherent negative properties with respect to shrinkage, adhesion, flexibility, and impact resistance.

U.S. Pat. No. 5,853,809 describes scratch resistant clearcoats containing surface reactive microparticles. The coating composition contains a film forming binder system containing a crosslinkable resin, colorless inorganic microparticles of about 1.0 to about 1000 nanometers having a functionality reactable with the crosslinkable resin, and a solvent system for the crosslinkable resin.

Some attempts have been made in the art to improve abrasion resistance but these efforts have not addressed the issue of scratch resistance. For example, WO 00/39042 describes a surface covering comprising at least one layer containing wear-resistant particles, such as aluminum oxide. The particle size of the wear-resistant particles is from about 10 micrometers to about 350 micrometers, and more preferably from about 20 micrometers to about 250 micrometers, and most preferably from about 30 micrometers to 200 micrometers. Wear resistance is determined by abrasion tests such as the Taber abrasion test and the effect of the particles in the surface coating is described as providing abrasion resistance. No differentiation with respect to scratch resistance is made.

Likewise, EP 235 914 describes coating compositions for producing a texture finish onto a substrate, the composition comprising an adhesion promoter for promoting adhesion to the substrate, a radiation-curable component and a texture modifying amount of microspheres substantially homogeneously dispersed therein. The microspheres can be glass and/or ceramic and/or polymeric materials. The incorporation of fine glass, ceramic or polymeric solid beads or hollow spheres into a suitable radiation-curable component which, on curing, sets to form a matrix holding the beads or spheres on the substrate, enables a textured appearance to be provided and an abrasion resistance comparable to prior art methods. The particle size of the microspheres is up to 120 micrometers and more particularly from 15 to 60 micrometers and advantageously about 30 micrometers.

U.S. Pat. No. 6,399,670 relates to a pre-cured coating mixture comprising a radiation curable resin, an initiator, and texture-producing particles having an effective size to provide a macroscopic texture upon application of the mixture on a substrate. Preferred sizes of the texture-producing particles is 30 to 350 $\mu$m. The coating mixture utilizes nanometer sized inorganic particles having diameters from 1 to 100 nm (0.001 micrometers to 0.1 micrometers). Example 3 shows that inorganic particles (alumina) outside of the range of the '670 patent on the order of 1.5 micrometers produce coatings which are not as transparent as coatings of the invention which utilize nano-size inorganic particles as disclosed and that scratch resistance was poor inasmuch as visual scratches were present after testing.

Thus, there have been attempts to provide clear topcoatings having greater abrasion resistance without regard to the scratch resistance of the material. There also have been attempts to find organic coatings with scratch resistance that provide appropriate properties for a variety of uses. However, these attempts have required the use of harder polymers, reactive systems or texture-modifying systems. Thus, there is still a need in the art for organic coatings which provide improved scratch resistance without negatively impacting other physical properties of the coating such as color, flexibility, gloss, gloss retention, impact resistance, opacity, and stain resistance.

SUMMARY OF THE INVENTION

The present invention is directed to a scratch resistant, smooth surface coating made from cured compositions comprising one or more curable polymers, and an inorganic filler in an amount effective to enhance the scratch resistance of the coating, the filler selected from the group consisting of aluminum oxide, silicon dioxide, ceramic spheres, and mixtures thereof, wherein the inorganic filler has a $50^{th}$ percentile (by volume) particle diameter (median size) of from 3 to 9 micrometers. The coatings containing such fillers alone do not have a discernible texture as applied to non-textured surfaces. The coatings are especially suited as transparent coatings applied on texture and non-textured substrates.

In another aspect of the invention, a process for improving the scratch resistance of a radiation curable coating is provided comprising incorporating aluminum oxide, silicon dioxide, ceramic spheres and mixtures thereof having a particle size of about 3 to about 9 micrometers in a radiation curable coating composition, applying the coating composition to a substrate and curing the coating composition. The coating obtained upon curing the coating composition has improved scratch resistance over that typically found in radiation curable coatings. The coating preferably exhibits slight or substantially no scratches when exposed to rubbing with steel wool.

In a further aspect of the invention, a method for producing scratch resistant flooring is provided. This method comprises applying to a flooring substrate a coating composition comprising one or more radiation curable polymers, and an inorganic filler in an amount effective to enhance the scratch resistance of the flooring, wherein the inorganic filler has a particle size of 3 to 9 micrometers and is selected from the group consisting of aluminum oxide, silicon dioxide, ceramic spheres and mixtures thereof; and curing the radiation curable polymers.

In yet another aspect of the invention, a scratch resistant cured coating having a textured surface is disclosed and further comprising texture-producing particles in the coating. The coating comprises one or more curable polymers, an inorganic filler in an amount effective to enhance the scratch resistance of the coating, the inorganic filler having a $50^{th}$ percentile particle diameter (median size) of from about 3 to about 9 micrometers, and texture-producing particles of a size sufficient to produce a texture that is visible to the consumer. General diameter sizes for the texture-producing particles are in the range of from about 10 to about 150 micrometers $50^{th}$ percentile particle diameter (median size). The textured coatings have a non-smooth surface and are aesthetically pleasing. Advantageously, the coatings including the texture-producing particles have low viscosity and are easily applied to a substrate, while the scratch resistance of the cured coating is maintained.

The coating including the texture-producing particles has low viscosity before curing in the range generally from about 100 to about 70,000 cps (mPa-s) measured at a shear rate of 0.15 s$^{-1}$. In view of the viscosities, the coatings comprising the texture-producing particles can be easily applied to various substrates with techniques known in the art such as, but not limited to roller coating, spraying, and air-knifing. The surfaces of the cured coatings are substantially scratch resistant.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
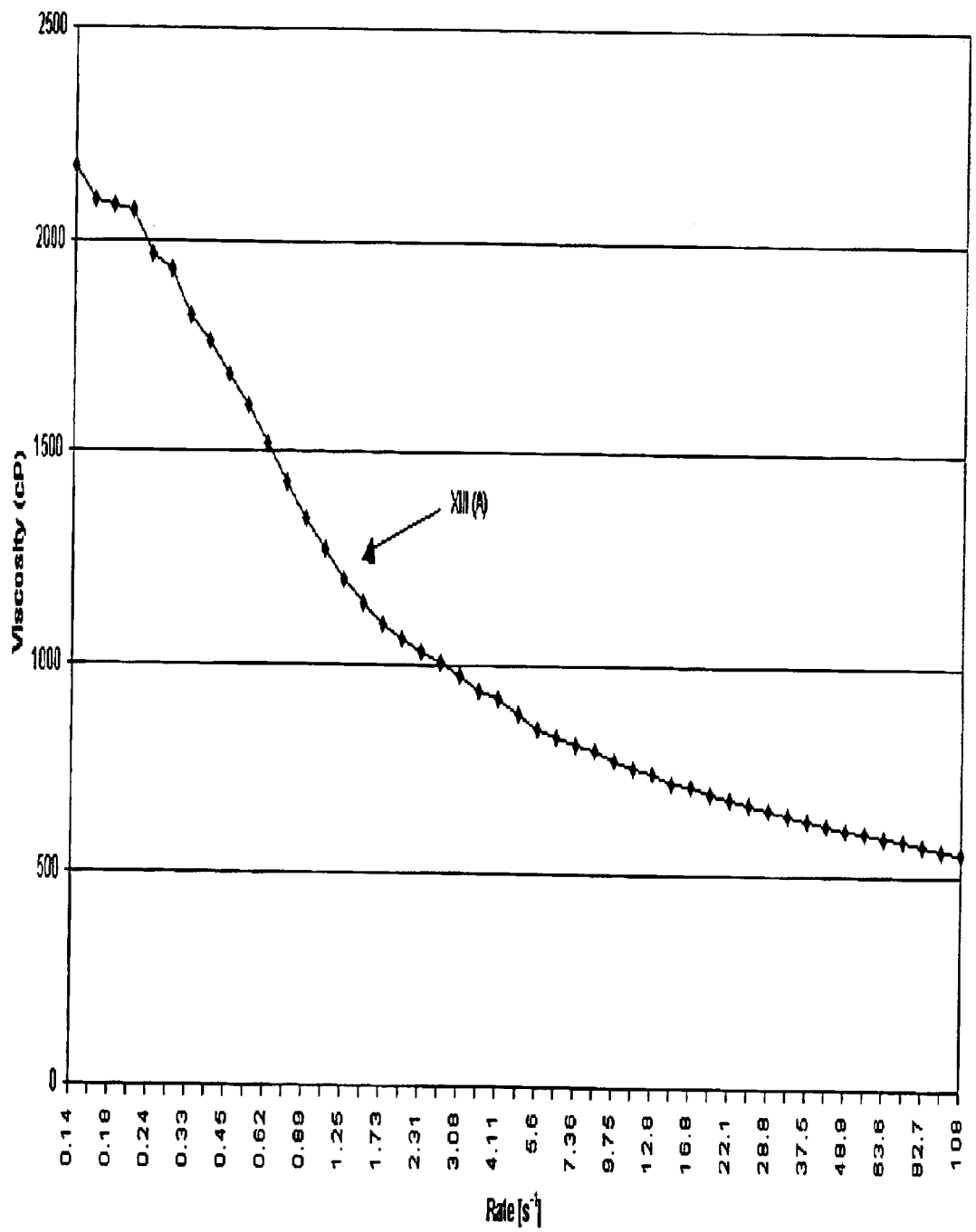
FIG. 1 is a plot of viscosity (cps (mPa-s)s(mPa-s))(mPa-s) versus shear rate (Sec.$^{-1}$) of one embodiment of a coating of the present invention comprising texture-producing particles as a function of shear rate prior to curing.

The coating compositions and methods of the present invention generally will utilize organic polymer materials known to those in the coating arts as radiation curable polymers. The type of polymers used in the coating compositions will depend on the ultimate use proposed for that formulation. Radiation curable coatings, such as UV curable coatings are used extensively in a variety of fields such as the manufacture of high performance commercial and residential vinyl flooring products. These coatings may be applied to the surface of the product to provide enhanced performance characteristics. The ability to provide a coating with improved scratch resistance is highly desirable and found to be dependent upon the particle size of inorganic filler materials specified below. It has now been discovered that certain inorganic filler materials in particular diameter sizes incorporated into curable polymer fluids cure into scratch resistant coatings. The surprising effect of these types of inorganic fillers is that they provide steel wool scratch resistance without negatively impacting the coating appearance, performance properties, and application parameters of the curable polymer systems. In these systems steel wool scratch resistance is independent of the film thickness.

As used herein, "scratch resistance" is the ability of a coating to resist permanent scratching by sharp, angular, or otherwise similarly constructed objects drawn across the surface under either a constant or progressive load. Scratch resistance is distinguished from abrasion resistance. Abrasion relates to the resistance to removal of coating material. Scratching is characterized by the tendency to form single or multiple linear cuts or depressions that penetrate and fracture or deform the coating, causing permanent surface defects that are undesirable either from a point of functionality or aesthetics. Scratch resistance may be measured for example, by utilizing either a Teledyne Shear/Scratch tester with a stylus such as a diamond-tipped stylus. However experience has shown that the Teledyne test results can be skewed depending on the flexibility of the substrate, especially when the coating is applied to a resilient substrate. A test based on hand application of a steel wool abrasive pad is a measure of scratch resistance that is not influenced by the substrate. The steel wool test is accomplished by applying moderate downward pressure by hand to a #00 steel wool pad while moving the pad back and forth across the coating surface for a minimum of 5 cycles, a cycle being one forward and backward motion. Evaluation of the test area for scratch resistance is made by observation with the naked eye and/or with the aid of a 40-power magnifying device. A qualitative rating system assigns a 0-rating, a 1-rating or a 2-rating, where 0 represents no visible scratch or a barely discernible scratch, a rating of 2 is representative that scratches are prominent on the surface and visible by the naked eye up to several meters away and is considered unacceptable, and a rating of 1 is representative of an acceptable surface with scratches that can be seen but are not prominent when viewed from a distance of up to several meters.

"Abrasion resistance" is the ability of a coating to resist wearing away when subjected to rubbing, scraping, erosion, or the combined effects of all. The consequences of poor abrasion resistance are characterized by partial or complete removal of the coating in the abraded area. This partial or complete removal of the coating produces undesirable changes in performance properties and in physical appearance, i.e. gloss, color, etc.

"Radiation curable" means compositions composed of various reactive components which cure by polymerization through free radical or ionic mechanisms with the use of radiation whether of the UV or EB type. Moisture curable and thermoset systems are excluded from radiation curable compositions.

"Moisture curable" polymers refer to the well-known polymers capped with isocyanate groups which undergo curing in the presence of water. The moisture cure system evaluated in TABLE VII is typical and is an aromatic prepolymer of toluene diisocyanate (35% solids by weight in organic solvents).

"Polyurethane dispersions" refer to well known aqueous products comprising isocyanate polymers that typically are carboxylated and chain-extended with diamine. These dispersions coalesce when dried, develop film properties on application of heat and can be crosslinked using external crosslinking agents reactive with carboxyl functionality.

"Two component cure polyurethanes" refer to the well-known class of coating materials that comprise on one side, a polyol and on the other side an isocyanate. The embodiment illustrated in TABLE VIII is a polyester polyol co-reacted with an aliphatic polyisocyanate resin based on hexamethylene diisocyanate (HDI), as 65% solids in solvent.

"Cationic UV curable polymers" are well known polymeric materials characterized by the presence of oxirane functionality, and which are curable through a cationic induced polymerization mechanism. Suitable diluents include cycloaliphatic epoxy monomers, or oligomers, and vinyl ether monomers. UV curable cationic photoinitiators that are suitable are the various sulfonium or iodonium initiators. A typical curable cationic epoxide coating is a mixture of 3,4-epoxy cyclohexylmethyl 3,4-epoxy cyclohexyl carboxylate, vinylcyclohexene monoxide, 3-ethyl-3-(hydroxymethyl) oxetane, and mixed triarylsulfonium hexafluorophosphate salts as the UV photoinitiator.

"Effective to enhance the scratch resistance of a coating" means that the amount of particles of the type and size specified used will result in the coating having improved scratch resistance as compared to a coating composition without any particles of the type and size specified, as measured by the use of a steel wool scratch test.

The "$50^{th}$ percentile particle diameter" or "particle diameter" as described in the present invention refers to a specified diameter at 50% cumulative volume of particles. The particle diameters can be measured by apparatuses such as Malvern Particle Size Analyzer, a Coulter Counter, or other such devices well known to those in the art.

The embodiments absent texture-producing particles are smooth and surface meaning that the coating itself in the cured state has no discernible texture seen with the naked eye, and the smoothness is sufficient so that an untextured (flat) coating exhibits gloss of at least 70 using a conventional gloss meter at 60° incident angle of light. Such smooth gloss coatings according to the invention can be coated on textured or untextured substrate surfaces, and can have a gloss that can be reduced by the use of a gloss-controlling agent or flatting agent.

It has now been discovered that by careful selection of types of particles and sizes of particles used as the inorganic filler material in a curable polymeric coating compositions, scratch resistance in such compositions can be improved over that previously known in the art.

The inorganic filler materials useful in the coating compositions of the invention that are of particular types that produce scratch resistant coatings and are defined as non-metallic materials that are typically crystalline in nature and selected from aluminum oxide, silicon dioxide, ceramic spheres or mixtures thereof. "Aluminum oxide" as used herein may include any aluminum oxide including $Al_2O_3$ products having up to 1% impurities. In a further aspect of the invention, the aluminum oxide may preferably include but is not limited to native alumina, found as the mineral carborundum and refined by the Bayer process to remove impurities and produce a nominal 99.5% $Al_2O_3$ product. The aluminum oxide may be any of the commercially available alumina products. The aluminum oxide particles found to provide improved scratch resistance have a $50^{th}$ percentile particle diameter (median size) of from 4 to 9 micrometers.

Also to be included in the definition of inorganic fillers for scratch resistant coatings are inorganic fillers that are ceramic spheres of which those naturally occurring or synthetically produced such that the composition may be from about 50 to about 99% by weight silicon dioxide and 0 to about 30% aluminum oxide, as the key components, and contain sodium oxide from 0 to about 11%, potassium oxide from 0 to about 6%, carbon from 0 to about 3% and/or calcium oxide, ferric oxide, magnesium oxide, titanium oxide, sulfur trioxide in quantities from 0 to about 2%.

The ceramic spheres preferably will be silica and alumina or alkali alumino silicate ceramic. Such products can be obtained commercially including 3M® Zeeospheres® ceramic microspheres. Especially preferred ceramic spheres are those identified by 3M® as G-200, W-210, and W-410. The 50th percentile particle size should be 3 to 9 micrometers.

A third group of useful inorganic filler materials is silicon dioxide spheres or particles. These typically have a composition of from about 50 to about 99% by weight silicon dioxide and 0 to about 30% aluminum oxide, as the key components, and contain sodium oxide from 0 to about 11%, potassium oxide from 0 to about 6%, carbon from 0 to about 3% and/or calcium oxide, ferric oxide, magnesium oxide, titanium oxide, sulfur trioxide in quantities from 0 to about 2%. The silicon dioxide material may be any of the commercially available products meeting the requirements set forth herein. One preferred silicon dioxide material has a composition of about 99% silicon dioxide. This material occurs naturally in globular balls and is process treated with high purity heat and sold commercially as Goresil®. The particle size of the silicon dioxide that provides improved scratch resistance will be a $50^{th}$ percentile diameter of 3 to 9 micrometers and preferably about 4 to 9 micrometers.

The inorganic filler material useful in this invention preferably shaped as platelets in the case of aluminum oxide, and spherical-, globular-shaped, solid silicon dioxide or ceramic spheres or mixtures thereof having a critical particle size range where it has been discovered that these filler materials, when provided as taught herein, give enhanced steel wool scratch resistance to a variety of curable coating materials. It has also been discovered that other inorganic filler materials do not provide this effect. For example, hollow borosilicate glass spheres, although similar in particle size and high in $SiO_2$ content, do not provide steel wool scratch resistance for UV curable polymer systems. Other inorganic particles having sufficient hardness and similar particle size to produce scratch resistant coatings may be undesirable for use in clear topcoats for flooring. This is particularly true of high opacity or high tint strength materials as they impart a high degree of color that is a negative attribute. Nylon particles are available in the range of particle sizes where scratch resistance is normally exhibited by the inorganic filler materials of the invention, but the nylon spheres do not contribute to improving steel wool scratch resistance.

It has also been found that synthetic amorphous silicas (fumed and precipitated), in the 3–9 micrometers $50^{th}$ percentile particle diameter size range do not provide improved steel wool scratch resistance. Synthetic amorphous silicas differ structurally from the above-mentioned aluminum oxide, silicon dioxide and ceramic spheres which impart scratch resistance. The amorphous silicas have porous structures with high surface areas and as such have very high oil absorptions. This characteristic feature of amorphous silicas is used to generate matte surfaces, and also in the theological modification of coatings. Typical use levels range of from 1 to 8 wt. %. Known products that fall within this classification are Acematt® TS 100 and Acematt OK412 from Degussa, MIN-U-SIL® from US Silica, or Cabosil® H5 from Cabot Industries.

Generally, the inorganic filler material of the invention will be used in an amount sufficient to provide enhanced scratch resistance to the coating. This amount generally will be about 8 to about 50% by weight of the total coating composition, with the preferable amount being about 8 to about 12% by weight of the total composition. While the preferable amount of the inorganic particles in a typical formulation is 8 to 12% by weight, amounts up to and greater than 25% also exhibit excellent scratch resistant properties. The effects of higher levels of inorganic particles incorporated beyond 25% by weight are, increased viscosity of the coating prior to application, incidence of unwanted coating texture, and detrimental effect on physical properties and including an increased tendency for producing white marks when the coating is gouged. Inorganic particles incorporated at a level less than 8% by weight fail to achieve the improved scratch resistance. It has been discovered that use of inorganic filler material as taught herein such as silicon dioxide, aluminum oxide or ceramic spheres, in the amount indicated and with the particle size of 3 to 9 micrometers dispersed in radiation curable polymer coating compositions enables a unexpected improvement in scratch resistance over previously known coatings. Although any of these materials may be used, ceramic spheres are preferred because of their better performance and tendency to be less prone to settling in the coating upon extended storage.

The radiation curable coating compositions comprise radiation curable polymers and/or polymer compositions composed of one or more reactive components which cure by polymerization through free radical or ionic mechanisms. Typically, the radiation curable polymer is present in an amount of about 12 to about 90 percent by weight of the total coating composition. Each component of the radiation curable coating composition is designed to perform a specific function in both the uncured composition and the cured film. The components generally include (1) a reactive low-to-medium weight polymer, typically referred to as an oligomer, which imparts primary performance characteristics to the cured film; (2) monofunctional and polyfunctional reactive monomers which can contribute to the degree of crosslinking required in the cured film and otherwise function as reactive diluent to adjust the viscosity of the formulation to a level suitable for application; and (3) various non-reactive, specialty components such as filler, colorants, slip agents and release agents, which are added for various end-use properties.

In general, the radiation curable coating compositions of the invention will typically include an oligomer, a blend of functional monomers, inorganic filler as taught herein, and additional agents such as synthetic waxes, matting agents, and additives. The oligomer typically may be any oligomer known to be useful in radiation curable compositions. Reactive oligomers which are preferentially employed in the energy-curable compositions of this invention include substantially any polymeric material characterized by the presence of at least one, preferably at least two, ethylenically unsaturated unit(s), and which is curable through a free radical-induced polymerization mechanism. Suitable oligomers include the known acrylourethane oligomers, polyester acrylate oligomers, epoxy acrylate oligomers, or silicone acrylate oligomers commercially available. In a preferred aspect of the invention, the oligomer is an acrylourethane oligomer.

The oligomer typically comprises from about 10 to about 90, preferably from about 30 to about 50, percent by weight of the total radiation curable coating composition.

In the preparation of a radiation-curable coating composition, the oligomer is typically utilized in combination with a reactive monomer diluent system and in some instances a photoinitiator. Reactive monomers which can be used alone or in combination with reactive oligomers as reactive diluent for such oligomers in the practice of this invention are well known. Broadly, suitable reactive monomer diluent systems comprise at least one unsaturated addition polymerizable monomer which is copolymerizable with the oligomer upon exposure to radiation.

The reactive monomer diluent can be monofunctional or polyfunctional, e.g. di- or tri-functional. A single polyfunctional diluent can be used, as can mixtures thereof; or a combination of one or more monofunctional reactive monomer diluents and one or more polyfunctional reactive monomer diluents can be used. Particularly preferred reactive monomer diluents are unsaturated addition-polymerizable monofunctional and polyfunctional acrylic monomers. Alkoxylated and non-alkoxylated acrylic monomers are useful reactive diluents and are well known. Preferred alkoxylated acrylic monomers contain from 2–14 alkoxy repeating units. Examples of such acrylic monomers include isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methylolmelamine, 2-(N,N-diethylamino)-ethyl acrylate, neopentyl glycol diacrylate, alkoxylated neopentyl glycol diacrylate, ethylene glycol diacrylate, hexylene glycol diacrylate, diethylene glycol diacrylate, dipropylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylol-propane triacrylate which contains from 2 to 14 moles of either ethylene or propylene oxide, triethylene glycol diacrylate, tetraethylene glycol diacrylate, alkoxylated neopentyl glycol diacrylate having from 2 to 14 moles of ethoxy or propoxy units, polyethylene glycol diacrylate, 1,3-butylene glycol diacrylate, 1,4-butanediol diacrylate, 1,6-hexanediol diacrylate, polyethylene glycol diacrylate, combinations thereof, and any corresponding methacrylates, as well as mixtures of any of the above.

The reactive monomer diluent system typically comprises from about 10 to about 85%, preferably from about 15 to about 45%, most preferably from about 30 to about 45% by weight of the total radiation-curable coating composition.

The UV curable coating compositions contain a photoinitiator to allow for curing of the polymer material. However compositions without photoinitiators may be cured using electron beam radiation. The photoinitiator can be by any of the known photoinitiators such as benzophenone, benzoin, acetophenone, benzoin methyl ether, Michler's ketone, benzoin butyl ether, xanthone, thioxanthone, propiophenone, fluorenone, carbozole, diethyoxyacetophenone, 1-hydroxy-cyclohexyl phenyl ketone, the 2-, 3- and 4-methylacetophenones and methoxyacetophenones, the 2- and 3-chloroxanthones and chlorothioxanthones, 2-acetyl-4-methylphenyl acetate, 2,2'-dimethyoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-iso-propylthioxanthone, 2methylthioxanthone, 2-decylthioxanthone, 2-dodecyl-thioxanthone, 2-methyl-1-[4-(methyl thio)phenyl)]-2-morpholinopropanone-1, combinations thereof and the like.

The photoinitiator or combination of photoinitiators is typically utilized in an amount ranging from about 0.5 to about 15, preferably from about 1 to about 5 percent by weight of the radiation-curable coating composition.

The photoinitiator selected for use in a particular composition will depend on the coating composition and use of the coating. Preferably, the photoinitiator will be of the type found to be useful in curing polymers by exposure to ultraviolet light. Most preferably, the photoinitiator will allow for curing in air under standard mercury lamps such as those utilized in well known AETEK® UV processors available from Aetek UV Systems, Inc., Romeoville, Ill.

Optional components also may be present in the coating composition of the present invention such as additives to control rheology, gloss, improve surface wetting, promote adhesion, and to eliminate foaming. These additives include, for example, synthetic silicas and waxes, modified polysiloxanes, and other polymer additives known to those skilled in the art coatings formulation. The amount of optional component will depend on the purpose and type of the additive used and can be determined by one skilled in the art.

The coating compositions of the present invention are liquid, one component coatings which are prepared by incorporation of the inorganic particles in to the coating with the aid of a high-speed disperser such as a Cowles® or Hockmeyer® mixer. The coating is dispersed until the inorganic particles are uniformly dispersed. One skilled in the art can determine when the proper degree of dispersion has been obtained. The composition may be cured by any means known to one skilled in the art. In one aspect of the invention, the composition is cured by exposure to ultraviolet light provided from a stand mercury lamp used in the AETEK® UV Processor.

In yet an additional embodiment of the present invention, the curable coating compositions additionally comprise texture-producing particles, which upon curing of the coating provide texture to the surface of the coating which is perceptible to the naked eye. By texture it is meant that substantially random peaks, rises, hills, or bumps, etc. of varying heights are randomly formed on the surface of the coating. Thus, the surfaces of the cured coatings including the texture-producing particles are non-smooth. Accordingly, the cured, textured coatings can have varying thicknesses which, for example can differ, from a first distance between a base of the coating to a first height and a second distance between the base of the coating and a second height, by generally from about 1 to about 300 micrometers and preferably from about 2 to about 150 micrometers due to the incorporation of the texture-producing particles therein.

The texture-producing particles can be utilized in the coatings of the present invention to impart varying degrees of texture ranging from relatively fine, yet visible texture, to more visually apparent coarse textures. The texture-producing particles are randomly, but uniformly distributed throughout the coating layer and preferably can protrude from the surface of the layer. Texture-producing particles can have average particle sizes which are less than, substantially equal to, or greater than the thickness of the coating after it has been applied to and cured on a substrate. Generally, the degree of texture imparted by the texture-producing particles can be controlled by varying the ratio of the particle size of the particles in relation to the thickness of the coating.

Texture-producing particles of the present invention can comprise organic materials, inorganic materials, or a combination thereof. The particles should be chosen so that they are compatible with the various other components of the coating composition. In order to produce texture in the cured coating, the texture-producing particles are preferably insoluble, or substantially insoluble in the coating. The texture-producing particles according to the present invention should, of course, be chemically inert towards the other ingredients of the coating composition. Pretreatment of the texture-producing particles with one or more known coupling agents is optional to provide additional compatibility or adhesion between the particles and other coating composition components. Organic texture-producing particles are preferred.

Various inorganic materials which are suitable as texture-producing particles include, but are not limited to, alumina, alumina derivatives such as alumino silicates, alumina coated on silica, ceramic, glass, silica, or combinations thereof.

Organic texture-producing particles include both thermoplastic and thermosetting polymers or copolymers, and solid waxes, microspheres and/or beads thereof, etc. Example polymers include, but are not limited to, polyamides, including nylons such as nylon 6 and nylon 12, polyethylene, polypropylene, fluorinated polymers such as polytetrafluoroethylene, urea-formaldehyde or combinations thereof. Polyamide particles are preferred.

The texture-producing particle waxes of the present invention can be selected from any of the known classes of waxes, i.e. vegetable waxes, animal waxes, mineral waxes, petroleum waxes, synthetic waxes, and the like. Thermoplastic waxes except those that liquefy, used as rheology control agents, and with melting points above the coating processing temperatures are preferred texture-producing particles. Example of thermoplastic waxes include, but are not limited to, polyolefin waxes such as polyethylene waxes (both low and high density) and polypropylene waxes (both low and high density), polytetrafluoroethylene waxes, polyester waxes, and polyamide waxes, with polyolefin waxes being preferred. Combinations of waxes can be utilized as texture-producing particles.

The texture-producing particles of the present invention have average particle sizes ($50^{th}$ percentile diameter) generally from about 10 to about 150 micrometers, and preferably from about 15 or about 18 to about 75 micrometers. The texture-producing particles are utilized in the coating compositions of the present invention in amounts generally from about 1% to about 20% by weight, desirably from 2% to about 15% by weight and preferably from about 4% to about 10% by weight, based on the total weight of the coating composition. Any combination of texture-producing particles noted herein can be utilized in a single coating composition.

When the texture-producing particles are used in the coating compositions of the present invention, the coatings exhibit low viscosities before curing on the order of generally from about 100 to about 70,000 cps (mPa-s), desirably and preferably from about 200 to about 50,000 cps (mPa-s) at a shear rate of $0.15\ s^{-1}$ at room temperature. In view of the noted viscosities, the coatings freely flow and thin films can be rapidly laid down on substrates. The low viscosities enable the coatings of the invention to be sprayed, roll-coated, curtain coated, and air knifed as known in the art. Cured coating exhibiting texture is limited to a thickness of about 100% to 200% of the diameter of the texture-producing particles.

Preferred texture-producing particles are commercially available as polyamide particles under the Orgasol® mark from Elf Atochem of Philadelphia, Pa., and as polyolefin wax under the Shamrock ® mark from the Shamrock Corp. of Newark, N.J.

The following chart sets forth three preferred formulations for the embodiment of the present invention utilizing textures producing particles. The formulations produce cured coatings having texture which range from fine to coarse. All of the formulations have a #00 Steel Wool Scratch rating of zero, and thereby have excellent scratch resistance.

| Preferred Formulations | | | | |
|---|---|---|---|---|
| Ingredient | | % By Weight | | |
| Formulation | $D_{50}$ (μm) | A | B | C |
| Sartomer ® CN983 Aliphatic urethane diacrylate oligomer | | 37.6 | 37.6 | 37.6 |
| Sartomer SR238 1,6 hexane diol diacrylate | | 6 | 6 | 6 |
| Sartomer SR502- ethoxylated trimethylolpropane triacrylate | | 36.4 | 36.4 | 36.4 |
| Shamrock ® Ultrafine (polyethylene wax) particles | 37.8 | 5 | | |
| Shamrock 5378W particles | 49.2 | | 5 | |
| Shamrock 5384W particles | 65.6 | | | 5 |
| Goresil ® 525 (SiO₂ inorganic particles) | 5 | 12 | 12 | 12 |
| Photoinitiators and Wetting agents | | 3 | 3 | 3 |
| Total (wt %) | | 100 | 100 | 100 |
| Texture | | fine | medium | Coarse |
| #00 Steel Wool Scratch rating | | 0 | 0 | 0 |

The examples set forth hereinbelow illustrate that the coatings of the present invention containing texture-producing particles exhibit various textures ranging from fine to coarse, while maintaining scratch resistance. Accordingly, the coatings of the present invention with texture-producing particles have great utility for use on substrates in both the home and commercial settings.

The coating of the invention may be used on a variety of substrates but have been found particularly useful on substrates commonly used for paneling, cabinets and flooring, particularly those types of coatings which require scratch resistance and a glossy, non-textured coating. Synthetic substrates include a variety of polymeric substrates formed from well known polymers such as PVC, ABS, ASA, PS, HIPS, PC, PO, Acrylic, SMC and the like. The scratch resistant coating compositions of the invention preferably are utilized in the manufacture of resilient flooring, particularly polyvinyl chloride resilient flooring materials used in the production of plank, tiles and sheet vinyl. A resilient flooring as a substrate for the coatings can itself have an embossed texture or have no embossed textured, and typically has at least a resilient support layer, a wear surface and a topcoat over the wear surface. Resilient flooring may have additional layers present for providing additional wear resistance or for strengthening the flooring. The scratch resistant coating compositions of the invention are particularly useful as the topcoat of resilient flooring, preferably embossed or unembossed vinyl flooring.

In one particular aspect of the invention, a method is provided for producing scratch resistant flooring comprising applying to a substrate a coating composition comprising one or more radiation curable polymers, a photoinitiator, and an amount of inorganic filler effective to enhance the scratch resistance of the flooring, where the inorganic filler has a particle size of 3 to 9 micrometers and is selected from the group consisting of aluminum oxide, silicon dioxide, ceramic spheres and a mixture thereof; and curing the radiation curable polymers. Preferably, the substrate is a vinyl flooring material and is well known in the art.

The coating compositions of this invention can be applied and cured by any of the conventional known methods. Application of the coating can be by roll coating, curtain coating, airless spray, dipping or by any other procedure. The cure can be effected by exposure to a radiant energy source, as actinic radiation, especially ultraviolet light radiation, and energy from electron beam accelerators. The equipment utilized for curing, as well as the appropriate time for curing, and the conditions under which the curing is effected are well-known to those skilled in the art of radiation curing and do not require further elaboration herein.

In one aspect of the invention, a process for improving the scratch resistance of a radiation curable coating is provided. This process comprises incorporating one of the inorganic filler materials taught herein in a radiation curable coating composition, applying the coating composition to a substrate and polymerizing or curing the coating composition. The polymerizing or curing step results in a scratch resistant, smooth coating on the substrate which has no discernible coating texture.

Testing for scratch resistance of the formulations discussed herein was accomplished by applying moderate downward pressure to #0 and #00 steel wool pads while moving them back and forth across the coating for 5 or more cycles. Evaluation of the test area for scratch resistance was done by visual observation with the naked eye and under 40-power microscope.

The following examples are given to illustrate the invention and not to be construed to limit the scope of the invention.

EXAMPLE 1

Example 1 illustrates the Taber scratch resistance of UV curable coatings containing aluminum oxide. Photoglaze® U306, a commercially available UV coating from Lord Corporation, was used as the UV curable portion of the formulation. Aluminum oxide, of various particle sizes, was added to the U306 at different levels. The scratch resistance was tested using the Teledyne Taber Shear/Scratch Tester. The scratch resistance is defined as the weight applied to a diamond tipped stylus that causes a scratch in which dirt pick-up is observed. The coatings were applied at a film thickness of about 1 mil (25.4 μm) on Leneta® charts and laminated vinyl tile, cured in air at a conveyor speed of 65 ft/min. using one 200 (80 W/cm) and one 300 watt/inch (120 W/cm) lamp placed in series. The formulations and test results are in Table I.

TABLE I

Evaluation of Taber scratch using Aluminum Oxide

| Formulation | Lord U306 UV curable coating | A | B | C | D | E |
|---|---|---|---|---|---|---|
| Lord U306 UV curable coating | — | 70 | 60 | 70 | 60 | 55 |
| Micro Abrasives Micro Grit ® WCA Al$_2$O$_3$ (3 μm) | — | 30 | 40 | | | |
| Micro Abrasives Micro Grit WCA Al$_2$O$_3$ (20 μm) | — | | | | | 45 |
| Micro Abrasives Micro Grit WCA Al$_2$O$_3$ (30 μm) | — | | | 30 | 40 | |
| Total (wt %) | 100 | 100 | 100 | 100 | 100 | 100 |
| Teledyne Taber Scratch Tester(g) | 200 | 275 | 225 | 200 | 225 | 200 |

EXAMPLE 2

Formulations were prepared as in Example 1, using ceramic spheres in place of aluminum oxide. Photoglaze®U306, a commercially available UV curable coating from Lord Corporation, was used as the UV curable portion of the formulation. The ceramic spheres used were 3M® white Zeeospheres® ceramic microspheres. These spherically shaped particles are described in the literature as semi-transparent, white-colored microspheres of alkali aluminosilicate ceramic. The D$_{50}$ 50$^{th}$ percentile by volume particle diameter of W-210 microspheres is 3 micrometers by volume. The D$_{50}$ 50$^{th}$ percentile particle diameter of W-410 microspheres is 4 micrometers, by volume. The coatings were applied at a film thickness of about 1 mil on laminated vinyl tile, cured in air at 65 ft/min. using one 200 and one 300 watt/inch lamp placed in series. The formulations and test results are set forth in Table II.

TABLE II

| Formulation | Lord U306 UV curable coating | A | B | C |
|---|---|---|---|---|
| Lord U306 UV curable coating | 100 | 75 | 75 | 72.5 |
| 3 M W-210 Ceramic Spheres | | 25 | | |
| 3 M W-410 Ceramic Spheres | | | 25 | |
| Silquest ® 1100 | | | | 2.5 |
| Total (wt. %) | 100 | 100 | 100 | 100 |
| Teledyne Taber Scratch Tester/g | 250 | 375 | 275 | 300 |

EXAMPLE 3

A number of formulations were prepared as in Example 2, using ceramic spheres. The coatings were applied at a film thickness of about 1 mil (25.4 μm) on laminated vinyl tile, cured in air at 65 ft/min. (165.1 cm/min.) using one 200 and one 300 watt/inch (80 and 120 W/cm) lamp placed in series.

The formulations and test results are set forth in Table III.

TABLE III

| Formulation | Control | A | B | C | D | E |
|---|---|---|---|---|---|---|
| Lord U306 UV curable coating | 100 | 40 | | 40 | | |
| Lord U309 UV Curable coating | | | 40 | | 40 | 40 |
| 3M W-210 Ceramic Spheres | | | 60 | 30 | 60 | 60 |
| 3M W-410 Ceramic Spheres | | 60 | | 30 | | |
| Total (wt %) | 100 | 100 | 100 | 100 | 100 | 100 |
| Teledyne Taber Scratch tester/g | 150 | 325 | 575 | 400 | 850 | 750 |

The coatings were applied at film thickness of 1.0 mil (25.4 $\mu$m) on laminated vinyl tile, cured in air at 65 ft/min. using one 200 and one 300 watt/inch lamp placed in series.

The following results illustrate scratch resistance to #00 steel wool. The concentration of inorganic particles was set at 12% by weight of the formulation.

EXAMPLE 4

This series evaluated inorganic fillers in coatings applied to laminated vinyl tile at 1 mil thickness and cured as in the previous examples. The results demonstrate that while aluminum oxide does provide scratch resistance, ceramic spheres provide higher performance with minimal effects on the application and physical properties of the coating. The Aluminum Oxides labeled Micro Grit® WCA and Micro Grit Silane treated $Al_2O_3$ are supplied by Micro Abrasives Corporation and described in the literature as white platelet particles each being an individual crystallite. The ceramic spheres labeled W-210, W420, W-610, G-800 and G-850, are 3M Zeeospheres® ceramic microspheres. The W-210, W420, and W-610 are described in the literature as semi-transparent, white-colored, fine particle size, high-strength microspheres. G-800 and G-850 are described in the literature as gray and made of silica-alumina ceramic. The 50th percentile particle diameter ($D_{50}$) is listed by volume. The formulations and test results are set forth in Tables IVa and IVb.

TABLE IVa

| | $D_{50}$ | Amount (wt. %) | | | | |
|---|---|---|---|---|---|---|
| | ($\mu$m) | A | B | C | D | E |
| Lord U306 UV curable coating | | 88 | 88 | 88 | 88 | 88 |
| 3M W-210 Ceramic Spheres | 3 | 12 | | | | |
| 3M W-410 Ceramic Spheres | 4 | | 12 | | | |
| 3M W-610 Ceramic Spheres | 8 | | | 12 | | |
| 3M G-800 Ceramic Spheres | 21 | | | | 12 | |
| 3M G-850 Ceramic Spheres | 40 | | | | | 12 |
| #00 steel wool Scratch Rating | | 0 | 0 | 1 | 2 | 2 |

TABLE IVb

| Formulation | F | G | H | I | J | K |
|---|---|---|---|---|---|---|
| Lord U306 UV curable coating | 88 | 88 | 88 | 88 | 88 | 100 |
| Micro Abrasives Micro Grit WCA $Al_2O_3$ 3 $\mu$m | 12 | | | | | |
| Micro Abrasives Micro Grit WCA $Al_2O_3$ 9 $\mu$m | | 12 | | | | |
| Micro Abrasives Micro Grit WCA $Al_2O_3$ 20 $\mu$m | | | 12 | | | |
| Micro Abrasives Micro Grit Silane treated/$Al_2O_3$ 3 $\mu$m | | | | 12 | | |
| Micro Abrasives Micro Grit Silane treated/$Al_2O_3$ 15 $\mu$m | | | | | 12 | |
| #00 Steel wool scratch rating (avg. of 3) | 1 | 1 | 2 | 1 | 2 | 2 |

EXAMPLE 5

Evaluation of Curing Systems

Tables V through XI demonstrate the invention in both UV curable and non-UV curable coating systems. Other cure systems tested in this example are coatings cured by free radical, cationic cured, isocyanate moisture cure, two-component cure polyurethane, polyurethane dispersion, and water borne free radical curing polymers. The free radical and cationic cure polymers are commercially available from Sartomer and Dow (formerly Union Carbide) respectively. The isocyanate moisture cure and two-component cure polyurethane systems are available from Lord Corporation. The polyurethane dispersion and aqueous UV curable free radical systems are available from Neo Resins, Inc. and Alberdingk Boley, Inc., respectively.

TABLE V

UV Free Radical Cure System

| Ingredient | % By Weight | |
|---|---|---|
| Sartomer CN983 Aliphatic urethane diacrylate oligomer | 37.6 | 37.6 |
| Sartomer SR238 1,6 hexane diol diacrylate | 6.2 | 4.6 |
| Sartomer SR502- ethoxylated trimethylopropane triacrylate | 41.0 | 35.7 |
| 3M W-210 Ceramic Spheres | 12.1 | 18.0 |
| Photoinitiators and Wetting agents | 3.0 | 3.0 |
| Total (wt. %) | 100.0 | 100.00 |
| #00 Steel Wool Scratch rating | 0 | 0 |

TABLE VI

UV Cationic Cure System

| Ingredient | % By Weight | |
|---|---|---|
| Cyracure ® UVR 6110 Cycloaliphatic diepoxide | 50.16 | 46.72 |
| Cyracure UVR 6100 (86% UVR-6110, 14% vinylcyclohexene monoxide) | 22.00 | 20.49 |
| Cyracure UV1-6990 (mixed triarylsulfonium hexafluorophosphate salts) | 2.64 | 2.46 |
| Cyracure 6000 (3-ethyl, 3-(hydroxymethyl) oxetane) | 13.2 | 12.29 |

TABLE VI-continued

UV Cationic Cure System

| Ingredient | % By Weight | |
|---|---|---|
| Wetting agents | 0.04 | 0.04 |
| 3M W-210 Ceramic Spheres | 12.00 | 18.00 |
| Total (wt. %) | 100.00 | 100.00 |
| #00 Steel Wool Scratch rating | 0 | 0 |

TABLE VII

Moisture Cured Isocyanate Systems

| Ingredient | Control | A | B | C | D |
|---|---|---|---|---|---|
| | | % By Weight | | | |
| Lord Chemglaze ® Z016 | 100 | 88 | 82 | 75 | 50 |
| 3M W-210 Ceramic Spheres | — | 12 | 18 | 25 | 50 |
| Total (wt. %) | 100 | 100 | 100 | 100 | 100 |
| #00 Steel Wool Scratch rating | 2 | 2 | 2 | 2 | 2 |

TABLE VIII

Two-Component Cure Polyurethane Systems

| Ingredient | Control | A | B | C | D |
|---|---|---|---|---|---|
| | | % by Weight | | | |
| Lord Chemglaze ® 4103 A/B | 100 | 88 | 82 | 75 | 50 |
| 3M W-210 Ceramic Spheres | — | 12 | 18 | 25 | 50 |
| Total (wt. %) | 100 | 100 | 100 | 100 | 100 |
| #00 Steel Wool Scratch rating | 2 | 1 | 0 | 0 | 0 |

TABLE IX

Polyurethane Dispersion

| Formulation | Control | A | B | C | D |
|---|---|---|---|---|---|
| | | % by weight | | | |
| NeoRez ® 974 Polyurethane Dispersion | 100 | 94 | 90 | 85 | 67 |
| 3M W-210 Ceramic Spheres | 0 | 6 | 10. | 15 | 33 |
| Total (wt. %) | 100 | 100 | 100 | 100 | 100 |
| % 3M W-210 on Solids | 0 | 12 | 18 | 25 | 50 |
| #00 Steel wool scratch rating | 2 | 2 | 1 | 1 | 1 |

TABLE X

Aqueous UV Curable Free Radical system

| Formulation | Control | A | B | C | D |
|---|---|---|---|---|---|
| | | % by weight | | | |
| Lux 338 VP Aqueous UV | 100 | 95 | 92 | 88 | 71 |

TABLE X-continued

Aqueous UV Curable Free Radical system

| Formulation | Control | A | B | C | D |
|---|---|---|---|---|---|
| | | % by weight | | | |
| Curable Polymer 3M W-210 Ceramic Spheres | | 5 | 8 | 12 | 29 |
| Total (wt. %) | 100 | 100 | 100 | 100 | 100 |
| % 3M W-210 on Solids | | 12 | 18 | 25 | 50 |
| #00 Steel wool scratch rating | 2 | 1 | 1 | 1 | 1 |

The UV curable aliphatic urethane diacrylate oligomer, available from Sartomer was diluted with 1,6-hexanediol diacrylate and ethoxylated trimethylolpropane triacrylate monomers. The Polyurethane dispersion is an anionic aliphatic polyester dispersion 45% by weight in water with N-methyl-2 pyrrolidone and triethylamine for stabilization. The aqueous UV cure system evaluated is a blend of an aliphatic polyester polyurethane (25%) and acrylic acid ester copolymer (75%) 40% by weight in water. Each system was evaluated with various percentages by weight of W-210 ceramic spheres. The radiation cure systems were applied at a film thickness of 25 micrometers, and cured with 760 mJ/cm² UV energy. The resulting coating exhibited excellent steel wool scratch resistance. The aqueous UV curable system exhibited slightly less steel wool scratch resistance compared to the 100% solids UV curable cure systems. On the other hand the moisture cure system also applied at 25 micrometers did not perform as well and did scratch when tested by the same methods applied to the radiation cure systems. The moisture cure embodiment took 7 days to reach fully cured film properties.

EXAMPLE 6

Evaluation of other Inorganic Particles for Steel Wool Scratch

The examples below illustrate the effects of borosilicate glass spheres and silicone dioxide particles alone and in combination with nylon particles.

TABLE XIa

| Ingredient | Particle Size | % By Weight | | | | | |
|---|---|---|---|---|---|---|---|
| Lord U306 UV curable coating | | 88 | 82 | 88 | 70 | 88 | 82 |
| Goresil 525 | 5 µm | 12 | 18 | | | | |
| Goresil 825 | 8 µm | | | 12 | 30 | | |
| Sphericel Borosilicate Glass Spheres | 11.7 µm | | | | | 12 | 18 |
| Total (wt. %) | | 100 | 100 | 100 | 100 | 100 | 100 |
| Steel Wool Scratch rating | | 1 | 1 | 1 | 1 | 2 | 2 |

TABLE XIb

Other Inorganic Fillers for Evaluation of Scratch Resistance

| Ingredient | % By Weight | |
|---|---|---|
| Lord U 309 UV curable coating | 90.00 | 73.00 |
| 60 μm nylon | 5.00 | 5.00 |
| Sartomer SR 306 | 5.00 | 10.00 |
| 3M W-210 Ceramic Spheres | | 12.00 |
| Total (wt. %) | 100.00 | 100.00 |
| #00 Steel Wool Scratch rating | 2 | 0 |

The testing of additional sizes and types of inorganic particles indicates that the specified particles within the size range of 3–9 micrometers are each effective in providing coatings having steel wool scratch resistance. Two grades of Goresil® silicon dioxide particles were evaluated. The mean particle sizes of the two grades are 5 and 8 micrometers. Goresil® silicon dioxide particles are a form of Cristobalite silica, are translucent particles with a composition of 99% silicon dioxide that occur naturally as globular balls and undergo a final process treated with high purity heat. Goresil® silicon dioxide particles are available from C.E.D. Processed Minerals Inc Sphericel® hollow glass spheres (supplied by Potters, a division of PQ corporation) are borosilicate glass ($SiO_2$—81%, $B_2O_3$, —13%, $Na_2O+K_2O$—4%, $Al_2O_3$—2%). Sphericel® glass microspheres have a mean diameter of 11.7 μm. They are noted for their mechanical and thermal stability, but failed to provide steel wool scratch resistance when formulated and applied in the same manner as the ceramic spheres or the Goresil spheres. Previous testing of nylon spheres in the 10–12 micrometers particle size range also failed to show any improvement for steel wool scratch, as was the case with the 60-micrometer nylon spheres. Nylon particles used in combination with ceramic spheres provide excellent scratch resistance (see Table IXb) equal to the level of scratch resistance observed with ceramic spheres absent nylon particles. Incorporation of the nylon spheres is known to improve the abrasion resistance of the coating and is confirmed when tested by measuring the coating weight loss after abrasion with Taber abrasive wheels, however this demonstration makes clear that improved abrasion resistance does not necessarily result in improved scratch resistance.

EXAMPLE 7

Evaluation of the Effect of Film Thickness on Steel Wool Scratch Resistance

TABLE XII

Film Thickness Evaluation

| Ingredient | Dry Film Thickness | | | |
|---|---|---|---|---|
| Coating from Example 4A | 25 micrometers | 50 micrometers | 75 micrometers | 150 micrometers |
| #00 Steel Wool Scratch Rating | 0 | 0 | 0 | 0 |

Application of acrylourethane to Leneta charts at increasing film thickness shows that as film thickness increases there in no change in steel wool scratch resistance and is believed to be aided by the relatively fast cure of the UV cure system.

EXAMPLE 8

Evaluation of Coatings with Texture-Producing Particles

Table XIII demonstrates the invention of textured coatings which include texture-producing particles. Textured coatings having textures ranging from fine to coarse were produced utilizing the teachings of the present invention. The following Table XIII illustrates suitable formulations for producing textured coatings having excellent scratch resistance. FIG. 1 illustrates a graph of viscosity as a function of shear rate for Example A of Table XIII.

TABLE XIII

Texture-producing Particles Evaluation

| | | Amount (wt. %) | | | | | |
|---|---|---|---|---|---|---|---|
| | $D_{50}$ (μm) | A | B | C | D | E | F |
| Lord U306 UV curable coating | | 83 | 83 | 83 | 83 | 83 | 83 |
| Goresil 525 (silica spheres) | 5 | 12 | | 12 | 12 | 12 | 12 |
| Goresil 825 (silica spheres) | 8 | | 12 | | | | |
| Shamrock Wax Texture UltraFine (polyethylene wax) | 37.8 | | | 5 | | | |
| Shamrock Texture 5378W (polyethylene wax) | 49.2 | 5 | 5 | | | | |
| Shamrock Texture 5384W (polyethylene wax) | 65.6 | | | | 5 | | |
| Orgasol 2002ES3 (polyamide particles) | 30 | | | | | 5 | |
| Orgasol 2002ES6 | 60 | | | | | | 5 |
| Total (wt %) | | 100 | 100 | 100 | 100 | 100 | 100 |
| #00 Steel Wool Scratch Rating | | 0 | 0 | 0 | 0 | 0 | 0 |

TABLE XIII-continued

Texture-producing Particles Evaluation

| | $D_{50}$ (μm) | A | B | C | D | E | F |
|---|---|---|---|---|---|---|---|
| | | Amount (wt. %) | | | | | |
| Viscosity cps(mPa-s) @ .15 s$^{-1}$ | | 2170 | 1452 | 2109 | 1908 | 1879 | 1952 |
| Texture Rating | | medium | Medium | fine | coarse | medium | coarse |

Table XIV sets forth comparative examples utilizing nano-sized alumina particles having $D_{50}$ of 37 nm in place of the inorganic particles used according to the present invention. Such examples are representative of the teachings according to U.S. Pat. No. 6,399,670 (Example 17). These coatings provide texture, but were not evaluated in the '670 disclosure for scratch resistance. At the use levels for the nano-sized alumina which provides a slight improvement in scratch resistance, as shown in TABLE XIV, there is also an unacceptable level of coating haze. The replacement of particles used in accordance with the invention with nano-sized alumina results in reduction of the scratch resistance as rated by the #00 Steel Wool Scratch Test and Tabor Scratch Test.

TABLE XIV

Comparative Example Including Nano-Sized Alumina Particles

| | $D_{50}$ (μm) | A | B | C | D | E | F |
|---|---|---|---|---|---|---|---|
| Lord U306 UV curable coating | | 89.00 | 88.69 | 83.54 | 79.34 | 77.48 | 48.85 |
| Polyolefin Waxes (for gloss reduction) | | 4.00 | 4.00 | 4.00 | 3.80 | 3.80 | 3.70 |
| Shamrock 5378W | 49.2 | 5.00 | 5.00 | 5.00 | 4.86 | 4.86 | 4.86 |
| Prehydrolized silane | | | 0.31 | | | 1.86 | |
| Silane treated 35 nm Al oxide (26%) | 0.035 | | | 7.46 | | | 42.59 |
| 37 nm Al oxide (Nanotech) | 0.035 | 2.00 | 2.00 | | 12.00 | 12.00 | |
| Total (wt %) | | 100.00 | 100.00 | 100.00 | 100.00 | 100.00 | 100.00 |
| Gloss | | 18.7 | 20.7 | 25.2 | 22.6 | 26.9 | 9.8 |
| Viscosity cps (mPa-s) @ 0.15 s$^{-1}$ | | 1,000 | <1,000 | <1,000 | 118,000 | 40,000 | 2,000 |
| Texture | | medium | medium | medium | Medium | medium | medium |
| #00 Steel Wool Scratch Rating | | 2 | 2 | 2 | 1 | 1 | 1 |
| Tabor Scratch | | 150 | 200 | 250 | 200 | 200 | 200 |
| Appearance of cured film | | clear | clear | clear | Milky haze | milky haze | milky haze |

EXAMPLE 9

Evaluation of Aqueous Coatings with Texture-Producing Particles

The following Table XV demonstrates textured coatings including texture-producing particles in aqueous based coatings. The cured coatings had texture and exhibit excellent scratch resistance according to the #00 Steel Wool Scratch Test.

TABLE XV

| | | A | B |
|---|---|---|---|
| Formulation | $D_{50}$ (μm) | % by weight | |
| Lux 338 VP Aqueous UV Curable Polymer | | 92.17 | |
| NeoRez R974 Polyurethane Dispersion | | | 93.61 |
| Goresil 525 | 5 | 5.53 | 4.51 |
| Shamrock 5378W wax | 49.2 | 2.30 | 1.88 |
| Total (wt. %) | | 100.00 | 100.00 |
| % Goresil on vehicle solids | | 12.0 | 12.0 |
| % Shamrock 5378W on vehicle solids | | 5.0 | 5.0 |
| Total (wt. %) | | 100.00 | 100.00 |
| Gloss | | 18.7 | 16.5 |

TABLE XV-continued

| | | A | B |
|---|---|---|---|
| Formulation | $D_{50}$ (μm) | % by weight | |
| Viscosity cps (mPa-s) @ 0.15 s-1 | | 240 | 290 |
| Texture | | medium | Medium |
| #00 Steel Wool Scratch | | 0 | 0 |

Two grades of Goresil® silicon dioxide inorganic particles having median particle sizes of 5 and 8 micrometers, as shown in Examples 8 and 9 provide excellent scratch resistance. Goresil® silicon dioxide particles are a form of Cristobalite silica, are translucent particles with a composition of 99% silicon dioxide that occur naturally as globular balls and undergo a final process treated with high purity heat. Goresil® silicon dioxide particles are available from C.E.D. Processed Minerals Inc.

Polyethylene Wax Texturie-Producing Particles

Three grades of Shamrock® waxes were evaluated and produced textures that ranged from fine to coarse. The median particle sizes of the three grades are 37.8, 49.2 and 65.6 micrometers. Shamrock waxes are synthetic waxes made from polyethylene and available from Shamrock Corp.

Polyamide Texturizing Particles

Two grades of polyamide particles were evaluated and produced textures that ranged from fine to coarse. The median $50^{th}$ percentile particle diameter sizes of the two grades are 30 and 60 micrometers. The polyamide particles are available from Elf Atochem under the ORGASOL® mark.

While the invention has been described in detail and with reference to specific embodiments thereof, it will be apparent to one skilled in the art that various changes and modifications can be made without departing from the spirit and scope thereof.

We claim:

1. A scratch-resistant coating composition having a textured surface upon curing when applied on a substrate, and having a thickness of from 5 to 150 micrometers, said coating comprising:
   a curable polymer,
   an inorganic filler in an amount effective to enhance the scratch resistance of the coating composition, and
   texture-producing particles, wherein the inorganic filler has a $50^{th}$ percentile particle diameter of from about 3 to about 9 micrometers, wherein said inorganic filler comprises ceramic spheres, and wherein said texture-producing particles have a $50^{th}$ percentile particle diameter of from about 10 to about 150 micrometers.

2. The scratch resistant coating composition according to claim 1, wherein said coating has a viscosity of from about 100 cps (mPa-s) to about 70,000 cps (mPa-s) at a shear rate of 0.15 $s^{-1}$, and wherein the curable polymer comprises acrylourethane, polyester acrylate, epoxy acrylate or cycloaliphatic epoxide polymers, or a combination thereof.

3. The scratch resistant coating composition according to claim 1, wherein the inorganic filler is present in an amount from about 8% to about 25% by weight of the total weight of said composition.

4. The scratch resistant coating composition according to claim 3, wherein the inorganic filler is present in an amount from about 8% to about 12% by weight.

5. The scratch resistant coating composition according to claim 1, wherein the curable polymer is a radiation curable polymer comprising an oligomer in an amount of about 10% to about 85% by weight of the total radiation curable coating composition and a monofunctional or polyfunctional reactive monomer in an amount of from about 10% to about 85% by weight of the total radiation curable coating composition.

6. A scratch resistant coating composition according to claim 1, wherein said texture-producing particles are present in an amount from about 1% to about 20% by weight based on the total weight of said coating, and wherein said coating has a viscosity before curing of from about 100 cps (mPa-s) to about 70,000 cps (mPa-s) at a shear rate of 0.15 $s^{-1}$.

7. A scratch resistant coating composition according to claim 6, wherein said texture-producing particles comprise alumina; an alumina derivative; alumina coated on silica; ceramic; glass; silica; a thermosetting or thermoplastic polymer, a thermosetting or thermoplastic copolymer, a thermosetting or thermoplastic wax, a thermosetting or thermoplastic microsphere or bead; or a combination thereof.

8. A scratch resistant coating composition according to claim 7, wherein said texture-producing particles comprise said thermosetting or thermoplastic polymer, thermosetting or thermoplastic copolymer, thermosetting or thermoplastic wax, thermosetting or thermoplastic microsphere or bead, or a combination thereof.

9. A scratch resistant coating composition according to claim 8, wherein said texture-producing particles comprise polyamide, polyolefin wax, or a combination thereof.

10. A scratch resistant coating composition according to claim 8, wherein said coating composition has a viscosity before curing of from about 200 to about 50,000 cps (mPa-s) at a shear rate of 0.15 $s^{-1}$, and wherein said texture-producing particles are utilized in the coating in an amount from about 2% to about 15% by weight.

11. A scratch resistant coating composition according to claim 10, wherein said coating further comprises a photoinitiator.

12. A process for preparing a scratch resistant, textured, cured coating, comprising the steps of:
    incorporating inorganic particles comprising ceramic spheres having a $50^{th}$ percentile particle diameter of about 3 to about 9 micrometers and texture-producing particles having a $50^{th}$ percentile particle diameter of about 10 to about 150 micrometers in a radiation curable coating composition:
    applying the coating composition to a substrate; and
    curing the coating composition, said cured coating having a textured surface.

13. A process for preparing a cured coating according to claim 12, wherein said coating has a viscosity of from about 100 cps (mPa-s) to about 70,000 cps (mPa-s) at a shear rate of 0.15 $s^{-1}$, and wherein said radiation curable coating composition comprises a radiation curable polymer comprising acrylourethane, polyester acrylate, epoxy acrylate or cycloaliphatic epoxide polymers, or combinations thereof.

14. A process for preparing a cured coating according to claim 13, wherein said inorganic particles are present in an amount from about 8% to about 25% by weight of the total weight of said composition.

15. A process for preparing a cured coating according to claim 14, wherein said inorganic particles are present in an amount from about 8% to about 12% by weight.

16. A process for preparing a cured coating according to claim 13, wherein said radiation curable polymer comprises an oligomer in an amount of about 10% to about 85% by weight of the total radiation curable coating composition and an monofunctional or polyfunctional reactive monomer in an amount from about 10% to about 85% by weight of the total radiation curable coating composition.

17. A process for preparing a cured coating according to claim 12, wherein said texture-producing particles are present in an amount from about 1% to about 20% by weight based on the total weight of said coating, and wherein said coating has a viscosity before curing of from about 100 cps (mPa-s) to about 70,000 cps (mPa-s) at a shear rate of 0.15 $s^{-1}$.

18. A process for preparing a cured coating according to claim 17, wherein said texture-producing particles comprise alumina; an alumina derivative; alumina coated on silica; ceramic; glass; silica; a thermosetting or thermoplastic polymer, said thermosetting or thermoplastic copolymer, said thermosetting or thermoplastic wax, said thermosetting or thermoplastic microsphere or bead, or a combination thereof.

19. A process for preparing a cured coating according to claim 18, wherein said texture-producing particles comprise said thermosetting or thermoplastic polymer, a thermosetting or thermoplastic copolymer, a thermosetting or thermoplastic wax, a thermosetting or thermoplastic microsphere or bead, or a combination thereof.

20. A process for preparing a cured coating according to claim 19, wherein said texture-producing particles comprise polyamide, polyolefin wax, or a combination thereof.

21. A process for preparing a cured coating according to claim 20, wherein said coating composition has a viscosity before curing of from about 200 cps (mPa-s) to about 50,000 cps (mPa-s) at a shear rate of 0.15 $s^{-1}$, and wherein said texture producing particles are utilized in the coating in an amount from about 2% to about 15% by weight.

22. A process for preparing a cured coating according to claim 20, wherein said coating further comprises a photoinitiator.

23. A process for preparing a cured coating according to claim 12, wherein said applying the coating composition to said substrate is performed by spraying, roll coating, curtain coating, or air-knifing or a combination thereof.

24. A process for preparing a cured coating according to claim 15, wherein said applying the coating composition to said substrate is performed by spraying, roll coating, curtain coating, or air-knifing or a combination thereof.

25. A flooring laminate, comprising:
   a substrate; and
   a textured cured coating having a thickness from 5 to 150 micrometers, said coating comprising a curable polymer, and inorganic filler in an amount effecting to enhance the scratch resistance of the coating, and texture-producing particles, wherein the inorganic filler has a $50^{th}$ percentile particle diameter of from about 3 to about 9 micrometers, wherein said inorganic filler comprises ceramic spheres, and wherein said texture-producing particles have a $50^{th}$ percentile particle diameter of from about 10 to about 150 micrometers.

26. A laminate according to claim 25, wherein the inorganic filler is present in an amount from about 8% to about 25% by weight of the total weight of said composition before curing, and wherein said cured coating is derived from a polymer comprising acrylourethane, polyester acrylate, epoxy acrylate, or cycloaliphatic epoxide polymers, or a combination thereof.

27. A laminate according to claim 26, wherein said textured-producing particles are present in an amount from about 1% to about 20% by weight based on the total weight of said coating before curing, and wherein said coating has a viscosity before curing of from about 100 cps (mPa-s) to about 70,000 cps (mPa-s) at a shear rate of 0.15 $s^{-1}$.

28. A laminate according to claim 27, wherein said texture-producing particles comprise alumina; an alumina derivative; alumina coated on silica; ceramic; glass; silica; a thermosetting or thermoplastic polymer, a thermosetting or thermoplastic copolymer, a thermosetting or thermoplastic wax, a thermosetting or thermoplastic microsphere or bead; or a combination thereof.

29. A laminate according to claim 28, wherein said texture-producing particles comprise said thermosetting or thermoplastic polymer, said thermosetting or thermoplastic copolymer, said thermosetting or thermoplastic wax, said thermosetting or thermoplastic microsphere or bead, or a combination thereof.

30. A laminate according to claim 29, wherein said texture-producing particles comprise polyamide, polyolefin wax, or a combination thereof.

31. A laminate according to claim 30, wherein said coating composition has a viscosity before curing of from about 200 cps (mPa-s) to about 50,000 cps (mPa-s) at a shear rate of 0.15 $s^{-1}$, and wherein said texture-producing particles are utilized in the coating in an amount from about 2% to about 15% by weight.

32. A laminate according to claim 31, wherein the curable polymer is a radiation curable polymer comprising an oligomer in an amount of about 10% to about 85% by weight of the total radiation curable coating composition and a monofunctional or polyfunctional reactive monomer in an amount of from about 10% to about 85% by weight of the total radiation curable coating composition.

33. A process for preparing a cured coating according to claim 12, wherein the radiation curable polymer is cured with ultraviolet light radiation.

34. A process for preparing a cured coating according to claim 12, wherein the radiation curable polymer comprises an acrylourethane polymer.

35. A scratch resistant coating composition according to claim 2, wherein said curable polymer contains an alkoxylated di- or tri-acrylate.

36. A scratch resistant coating composition according to claim 2, wherein said curable polymer is an acrylourethane and contains a non-alkoxylated acrylate selected from the group consisting of tripropylene glycol diacrylate, neopentylglycol diacrylate, trimethylolpropane triacrylate, 1,6-hexane diol diacrylate, 2-ethylhexyl acrylate, isobornyl acrylate, phenoxyethyl acrylate and isodecyl acrylate.

* * * * *